April 24, 1928.

C. H. HANSON

DRILL BIT

Filed March 29, 1927

1,666,898

Inventor
Carl H. Hanson
By his Attorney
George C. Heinrich

Patented Apr. 24, 1928.

1,666,898

UNITED STATES PATENT OFFICE.

CARL H. HANSON, OF HUDSON HEIGHTS, NEW JERSEY.

DRILL BIT.

Application filed March 29, 1927. Serial No. 179,291.

My invention relates to improvements in drills, particularly in drill bits for cutting tile, brick, concrete, marble, stone and the like, and it is the principal object of my invention to provide a drill bit which is adapted for use in any of the commonly used braces etc., and which besides cutting a clean hole within the shortest possible time, has a three pointed working end adapted to act as a guide to support the drill during its operation to prevent a swaying of the drill bit and consequent inaccurate operation.

Another object of my invention is the provision of a drill bit having a central bore for the formation of an air cushion therein during the drilling operation for facilitating the removal of the dust particles loosened during the drilling operation etc. through the longitudinal channels or grooves provided for this purpose in the shank of the drill bit.

A further object of my invention is the provision of a drill bit having a plurality of peculiarly shaped cutting points and faces grouped around the central bore in such manner as to produce the best results obtainable with instruments of this kind, the cutting faces being so arranged at the inner oppositely disposed sides of substantially triangular members with their inner edges facing each other and the center of the drill, so that a breaking out of the work-piece or chipping is positively avoided.

A still further object of my invention is the provision of a drill of simple and therefore inexpensive construction allowing a ready sharpening of its points and cutting faces.

These and other objects and advantages of my invention will become more fully known as the description thereof proceeds, and will then be specifically defined in the appended claim.

In the accompanying drawing forming a material part of this disclosure:

Figure 1:
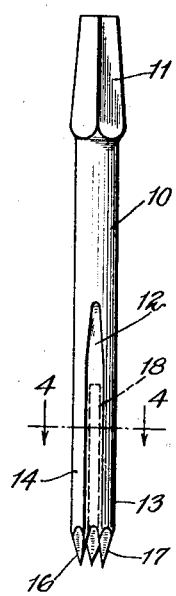
Fig. 1 is a front elevation of a drill bit constructed according to my invention.
Figure 2:
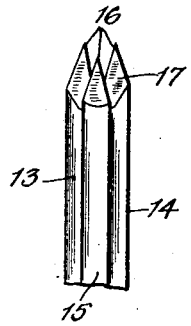
Fig. 2 is a fragmentary edge elevation of the bit point on a somewhat enlarged scale.
Figure 3:
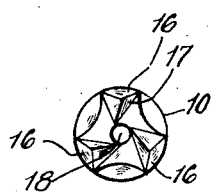
Fig. 3 is an end elevation thereof looking in the direction of the cutting end of the drill.
Figure 4:
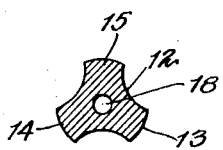
Fig. 4 is a cross-section on line 4—4 of Figure 1.

As illustrated on the drawing, the bit 10 has a shank of preferably circular or any other suitable cross-section and made of suitable material as for instance tempered steel, the upper end of which terminates in a squared butt 11 or the like for the reception by the chuck of a brace or the like instrument employed for imparting to the bit a rapid rotation.

At its opposite end the shank of the bit is formed for a certain part of its length with preferably three longitudinally extending grooves or channels 12 at one end getting gradually shallower and smoothly joining the outer face of the shank, while at their opposite end the grooves are deeper and end shortly before the extreme outer end of the drill, so that between each two of these channels a cutting member is formed or altogether three such members designated 13, 14 and 15, each projecting beyond the end of the channels and having a sharply pointed outer end 16, the ends of the three members in one plane to form an imaginary triangle acting as a support of the drill bit on the work-piece during the drilling operation preventing wabbling or swaying of the drill. Each of the three cutting members has substantially a triangular cross-section and two inner cutting faces 17 ending at their outer ends in the point 16. Each of these cutting faces is oppositely disposed to the cutting face of the next adjoining member from which it is however spaced to both sides of a groove so that the ends of these grooves present substantially V-shaped depressions getting gradually deeper towards the outer ends. The outer faces of the members 13, 14, 15 are slightly beveled towards their outer ends while their inner, sharp edges separating each two cutting faces 17 of each member are oppositely disposed and form the angle points of an imaginary triangle.

The shank is provided in its center with a longitudinally extending bore 18 extending therein for part of its length and ending between the outer ends of the V-shaped depressions of the grooves 12 opening into the space between the members 13, 14, 15 at this point for the formation of an air cushion therein to facilitate the removal of the drill dust.

It will be clear that in this manner I have provided a drill bit resting during its operation at all times with its three points evenly on the work-piece and thus preventing swaying or wabbling of the tool and ensuring an absolute accurate drilling through the work-piece during the rotation of the drill bit avoiding chipping and other damage to the work-piece. The oppositely disposed triangularly shaped cutting faces with their inner sharp edges and outer sharp points produce a smooth drilling hole in the work-piece so that no special finishing or trimming after the drilling operation is required. The air cushion formed within the bore will effectively blow the dust out through the channels 12 so as to prevent impediment of the work so that the same may progress without interruption.

It is to be understood that while I have disclosed the preferred form of my invention as an example of the many ways to practically construct the same, I do not wish to limit myself to the exact construction shown and described, but reserve my right to make such changes in the construction as come within the scope of the appended claim without departure from the spirit of my invention.

Having thus described my invention, what I claim as new, and desire to secure by Letters Patent is:

In a drill bit a circular shank having a plurality of channels formed in part of its length, and a central bore ending before the inner ends of said channels open at the opposite end, a plurality of cutting members formed between said channels having sharp pointed outer ends situated in one level plane to form a support for the bit on the work piece during the operation thereof for preventing inaccurate drilling to produce a smooth drill hole, each of said members having two elongated sharp outer edges to limit the channels, the inner ends of said channels getting shallower towards the shank to run smoothly and gradually into the material thereof, the opposite ends of the channels getting gradually deeper to form with the members extending beyond the ends of the channels substantially V-shaped recesses, the central bore in said shank ending at the end point of said channels between the foot of the member points, each of said members having below their points two adjoining angularly disposed cutting faces, a ridge separating the two faces of each member, the outer faces of said members beveled towards the point, and a square butt on said shank for allowing an attachment of the same to the chuck of a brace.

Signed at New York, in the county of New York and State of New York, this 23rd day of February A. D. 1927.

CARL H. HANSON.